United States Patent
Jochim et al.

(10) Patent No.: US 8,843,218 B2
(45) Date of Patent: Sep. 23, 2014

(54) METHOD AND SYSTEM FOR LIMITED TIME FAULT TOLERANT CONTROL OF ACTUATORS BASED ON PRE-COMPUTED VALUES

(75) Inventors: Markus Jochim, Troy, MI (US); Lawrence E. Peruski, Canton, MI (US); Barbara J. Czerny, Clarkston, MI (US); Joseph G. D'Ambrosio, Clarkston, MI (US); Rami I. Debouk, Dearborn, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 362 days.

(21) Appl. No.: 13/188,785

(22) Filed: Jul. 22, 2011

(65) Prior Publication Data

US 2013/0024011 A1 Jan. 24, 2013

(51) Int. Cl.
| | | |
|---|---|---|
| *G05B 11/01* | (2006.01) | |
| *G06F 11/00* | (2006.01) | |
| *G05B 9/02* | (2006.01) | |

(52) U.S. Cl.
CPC ........................................ *G05B 9/02* (2013.01)
USPC ................ 700/14; 700/20; 700/82; 701/29.2; 714/13

(58) Field of Classification Search
None
See application file for complete search history.

(56) References Cited

U.S. PATENT DOCUMENTS

| | | | | |
|---|---|---|---|---|
| 4,974,155 | A * | 11/1990 | Dulong et al. | 712/219 |
| 6,046,937 | A * | 4/2000 | Komori et al. | 365/185.04 |
| 6,434,433 | B1 * | 8/2002 | Fischer et al. | 700/11 |
| 6,511,618 | B1 * | 1/2003 | Seki | 264/40.1 |
| 6,622,972 | B2 | 9/2003 | Urnes, Sr. et al. | |
| 2002/0005699 | A1 * | 1/2002 | Koenen et al. | 318/254 |
| 2003/0080256 | A1 * | 5/2003 | Urnes et al. | 244/194 |
| 2004/0103742 | A1 * | 6/2004 | Tesar | 74/490.03 |
| 2004/0249538 | A1 | 12/2004 | Osaki et al. | |
| 2005/0273182 | A1 * | 12/2005 | Pearce et al. | 700/20 |
| 2006/0126256 | A1 | 6/2006 | Forest et al. | |
| 2006/0235594 | A1 | 10/2006 | Knoefler et al. | |
| 2009/0206345 | A1 | 8/2009 | Kato et al. | |
| 2009/0216345 | A1 * | 8/2009 | Christfort | 700/21 |
| 2012/0290261 | A1 * | 11/2012 | Genta | 702/179 |

* cited by examiner

*Primary Examiner* — Sean Shechtman
(74) *Attorney, Agent, or Firm* — Quinn Law Group, PLLC

(57) ABSTRACT

A method of controlling an actuator includes developing a sequence of actuation commands $S(t_x)=C(t_x, t_x)$, $C(t_x, t_{x+1})$, ..., $C(t_x, t_{x+n})$ obtained from data sensed before time $t_x$ for controlling the actuator at different time intervals $(t_x, t_{x+1})$, $(t_{x+1}, t_{x+2})$, ..., $(t_{x+n-1}, t_{x+n})$. The sequence of actuation commands is transmitted to and stored in memory of an actuation ECU, which then applies the actuation command for time interval $(t_x, t_{x+1})$. If a fault affects a sensor, a control ECU or data communication therebetween, the actuation ECU will not receive an updated sequence of actuation commands $S(t_{x+1})$ at time $t_{x+1}$. If the updated actuation command sequence, the actuation ECU applies the actuation command for the time intervals $(t_{x+1}, t_{x+2})$, ..., $(t_{x+n-1}, t_{x+n})$ from the sequence of actuation commands $S(t_x)$ that is stored in the memory of the actuation ECU.

13 Claims, 1 Drawing Sheet

| 50 | 52 | 54 | 56 |
|---|---|---|---|
| 1 | $S(t_x) = C(t_x, t_x), C(t_x, t_{x+1}), C(t_x, t_{x+2}), C(t_x, t_{x+3})$<br>$S(t_x) = (0.00), (8.21), (9.45), (1.70)$ | 0.00 | Y |
| 2 | $S(t_{x+1}) = C(t_{x+1}, t_{x+1}), C(t_{x+1}, t_{x+2}), C(t_{x+1}, t_{x+3}), C(t_{x+1}, t_{x+4})$<br>$S(t_{x+1}) = (8.30), (9.33), (2.12), (0.05)$ | 8.30 | Y |
| 3 | $S(t_{x+1}) = C(t_{x+1}, t_{x+1}), C(t_{x+1}, t_{x+2}), C(t_{x+1}, t_{x+3}), C(t_{x+1}, t_{x+4})$<br>$S(t_{x+1}) = (8.30), (9.33), (2.12), (0.05)$ | 9.33 | N |
| 4 | $S(t_{x+1}) = C(t_{x+1}, t_{x+1}), C(t_{x+1}, t_{x+2}), C(t_{x+1}, t_{x+3}), C(t_{x+1}, t_{x+4})$<br>$S(t_{x+1}) = (8.30), (9.33), (2.12), (0.05)$ | 2.12 | N |
| 5 | $S(t_{x+1}) = C(t_{x+1}, t_{x+1}), C(t_{x+1}, t_{x+2}), C(t_{x+1}, t_{x+3}), C(t_{x+1}, t_{x+4})$<br>$S(t_{x+1}) = (8.30), (9.33), (2.12), (0.05)$ | 0.05 | N |

METHOD AND SYSTEM FOR LIMITED TIME FAULT TOLERANT CONTROL OF ACTUATORS BASED ON PRE-COMPUTED VALUES

TECHNICAL FIELD

The invention generally relates to a method and a system for controlling actuators of safety-critical applications for a limited time period in the presence of a fault affecting serial data communication, sensors or control Electronic Control Units (ECUs) with an actuation Electronic Control Unit.

BACKGROUND

Vehicles include many distributed control applications. The distributed applications include software that is executed on one or more control Electronic Control Units (ECU). The control ECU is connected to one or more sensors through a serial data link or through a direct connection. The sensors provide data to the control ECU through the serial data link or through the direct connection. The control ECU processes the data to derive an actuation command for an actuator based upon the data received from the sensor at any point in time. The actuation command is transmitted to an actuation ECU, which controls the actuator. The actuation command is transmitted via the serial data link. Some distributed applications are safety critical, and must maintain operation for a limited time, e.g., a few seconds, in the event of a fault in one of the sensors, the serial data link or the control ECU.

SUMMARY

A method of controlling an actuator is provided. The method includes developing a sequence $S(t_x)=C(t_x, t_x)$, $C(t_x, t_{x+1}), \ldots, C(t_x, t_{x+n})$, of actuation commands. The sequence of actuation commands $S(t_x)$ is computed based on corresponding sensor data obtained before time $t_x$ and provided to an actuation ECU at time $t_x$. Each actuation command $C(t_x, t_{x+i})$ with $0 \leq i \leq n$ is calculated based on corresponding sensor data obtained before time $t_x$ and is an appropriate command to be actuated during the time interval $(t_{x+i}, t_{x+i+1})$. The sequence of actuation commands $S(t_x)$ consequently contains commands for controlling the actuator at a plurality of different time intervals $(t_x, t_{x+1})$, $(t_{x+1}, t_{x+2})$, ..., $(t_{x+n}, t_{x+n+1})$ with $t_x < t_{x+1} < \ldots < t_{x+n} < t_{x+n+1}$. The method further includes storing the sequence of actuation commands received by the actuation ECU at time $t_x$ in the actuation ECU itself. The first actuation command $C(t_x, t_x)$ in the sequence is applied during the time interval $(t_x, t_{x+1})$. The actuation command for a specific time interval $(t_{x+i}, t_{x+i+1})$ with $i>0$ from the sequence $S(t_x)$ stored in the actuation ECU is applied only if the actuation ECU is unable to receive an updated sequence of actuation commands $S(t_{x+1})$ that was computed based on corresponding sensor data obtained before time $t_{x+1}$ to provide continued control of the actuator for additional n−1 time intervals.

Accordingly, the actuator may be controlled for a limited time period, i.e., n time intervals, even when communication with the actuation ECU is disrupted or sensor or control ECU failures occur, thereby providing for continued operation of a safety-critical application for a limited time. The sequence of actuation commands $S(t_x)$ includes estimated actuation commands for future time intervals. Accordingly, in the event serial communication is disrupted with the actuation ECU, or in case sensor or control ECU failures occur, the actuation ECU may use the estimated actuation commands for the future time intervals to continue operating the actuator.

The above features and advantages and other features and advantages of the present invention are readily apparent from the following detailed description of the best modes for carrying out the invention when taken in connection with the accompanying drawings.

DETAILED DESCRIPTION

Figures 1, 2:
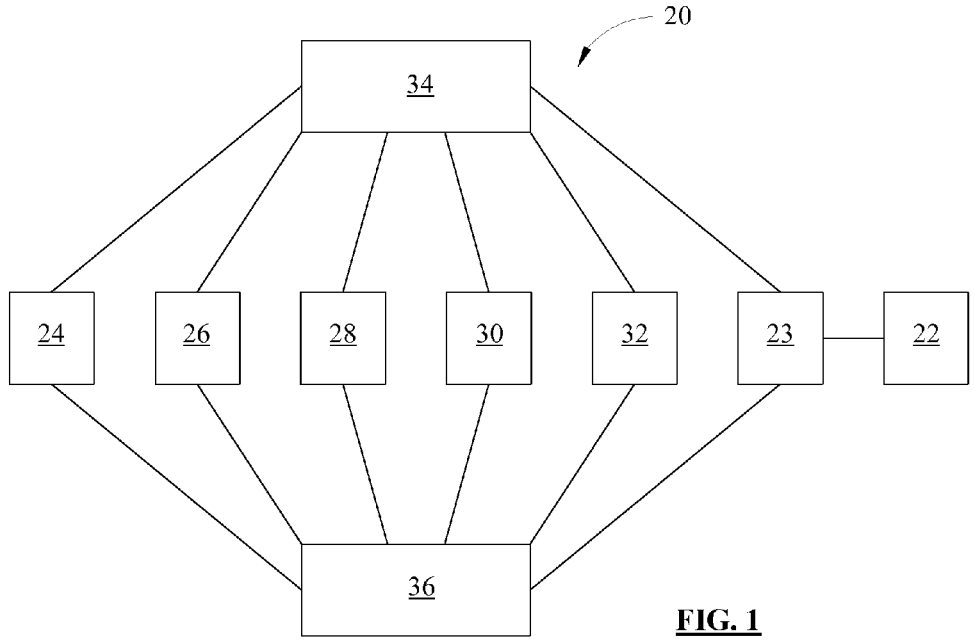
FIG. 1 is a schematic chart representing a control system for an actuator showing data flow between a plurality of sensors, a plurality of control ECUs, and an actuation ECU.
FIG. 2 is a chart showing an example of the method described herein applied to an exemplary steer-by-wire safety-critical application.

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to FIG. 1, wherein like numerals indicate like parts throughout the several views, a control system is generally shown at 20. The control system 20 is configured for controlling an actuator 22. The actuator 22 may include any type, style and/or configuration of actuator 22, and the control system 20 may be incorporated into any desirable assembly. For example, the actuator 22 may include an electric motor for a steer-by-wire steering system for a vehicle. Alternatively, the actuator 22 may include a brake actuator 22 for a stability control system 20. It should be appreciated that the exemplary embodiments noted above are not limiting, and that the invention may be applied to other assemblies and/or systems not described herein.

As shown in FIG. 1, the control system 20 includes at least one sensor, at least one control Electronic Control Unit (ECU), an actuation ECU 23, and at least one serial data link. More specifically, FIG. 1 shows a first sensor 24, a second sensor 26 and a third sensor 28; a first control ECU 30 and a second control ECU 32; a first serial data link 34 and a second serial data link 36. The serial data links 34, 36 may be equipped with central network infrastructure components such as but not limited to switches, hubs, routers, repeaters, active stars or bus guardians. While the control system 20 shown in FIG. 1 shows three sensors 24, 26, 28, it should be appreciated that the control system 20 may include any number of sensors, including zero sensors, and these sensors may be directly connected to the control system ECUs. The sensors 24, 26, 28 may include any sensor type, style and/or configuration suitable for sensing any required data necessary for controlling the specific type and/or style of actuator 22. The actuator 22 may be directly controlled by the actuation ECU 23, or connected to the actuation ECU 23 via one or more additional serial data links or integrated with the actuation ECU 23, or be controlled via any other appropriate embodiment. While the control system 20 of FIG. 1 shows two control ECUs 30, 32, it should be appreciated that the control system 20 may include only a single control ECU, or may alternatively include any number of control ECUs greater than the two shown. The control system 20 ECUs, i.e., the actuation ECU 23, the first control ECU 30, and the second control ECU 32, may each include any suitable ECU, and include any and all processors, memory, software, hardware, etc., necessary for receiving and sending data across the serial data link, processing the data to develop actuation commands for the actuator 22, and/or controlling the actuator 22.

Furthermore, while the control system 20 shown in FIG. 1 shows two serial data links 34, 36, it should be appreciated that the control system 20 may include only a single serial data link, or may alternatively include any number of serial data links greater than the two shown. The serial data links 34, 36 may include any suitable serial data links, including but not limited to CAN, FlexRay or Ethernet based serial data links.

In normal operation, the sensors 24, 26, 28 sense data related to the operation of the actuator 22. The data may include any relevant data including but not limited to a vehicle speed, a longitudinal acceleration rate, a lateral acceleration rate, an impact, a proximity to an object, etc. The sensors 24, 26, 28 may sense the same data independently of each other, or may each sense different data related to a different control parameter. The sensors 24, 26, 28 transmit their sensed data to the control ECUs 30, 32 through the serial data links 34, 36. As shown in FIG. 1, the sensors 24, 26, 28 transmit the data to the control ECUs through separate and redundant serial data links, i.e., the first serial data link 34 and the second serial data link 36. The first control ECU 30 and the second control ECU 32 may include redundant ECUs that are each configured to perform the same task. For example, each of the first control ECU 30 and the second control ECU 32 may be programmed to develop the same actuation commands for the actuator 22. These actuation commands are transmitted to the actuation ECU 23 through the separate and redundant serial data links, i.e., the first data link and the second data link. The actuation ECU 23 directly controls the operation of the actuator 22, and applies the actuation commands as programmed to control the actuator 22. The control system 20 shown in FIG. 1 may include several layers of redundancy, e.g., the redundant first serial data link 34 and the second serial data link 36, as well as the first control ECU 30 and the second control ECU 32 and also the redundant sensors 24, 26, 28 in case more than one of these sensors sense the same data independently. These layers of redundancy operate to provide continued control of the actuator 22 in the event that one of the components fails. For example, if the first serial data link 34 is interrupted, the second serial data link 36 is still capable of transmitting the required data. Similarly, if the first control ECU 30 fails, the second control ECU 32 is still capable of processing the data and developing the actuation commands for the actuator 22. However, some applications are safety critical, and require continued operation for a limited time. As such, the control system 20 may need to continue to be operational for at least a limited time in the event of multiple failures or faults in the control system 20 that prevent the normal operation thereof. Since the control system may or may not contain redundant serial data links, redundant sensors and redundant control ECUs, a failure of a single sensor, control ECU or serial data link may, depending on the design of the control system 20, also result in a scenario, where the actuation ECU 23 no longer receives actuation commands from the control ECUs.

The invention provides a method of controlling the actuator 22 for a limited time in the event of a fault that prevents the actuation ECU 23 from receiving the actuation commands from the control ECUs. The method includes sensing data at a time $t_x$. As described above, the data is related to the operation of the actuator 22, and may include any required type of data related to any operating parameter required to operate the actuator 22. The data may be sensed with one or more of the sensors 24, 26, 28 as described above. The sensors 24, 26, 28 may continuously sense the data, or may sense the data at pre-defined intervals or rates.

The sensed data obtained at time $t_x$ is transmitted to at least one control ECU through at least one serial data link. As shown in FIG. 1, the sensed data may also be transmitted through both the first serial data link 34 and the second serial data link 36 to each of the first control ECU 30 and the second control ECU 32 simultaneously or sequentially and independently of each other.

Once the first control ECU 30 and the second control ECU 32 receive the corresponding data sensed before time $t_x$, the first control ECU 30 and/or the second control ECU 32 process the corresponding data sensed before time $t_x$ to develop a sequence of actuation commands from the corresponding data obtained before time $t_x$. The sequence of actuation commands are instructions on how to control the actuator 22 at a plurality of different time intervals. The sequence of actuation commands for the different time intervals may, for example, be represented by: $S(t_x)=C(t_x, t_x), C(t_x, t_{x+1}), \ldots, C(t_x, t_{x+n})$, wherein $S(t_x)$ is the sequence of actuation commands and $t_x$ is the time at which the sequence is provided to the actuation ECU 23. Each actuation command $C(t_x, t_{x+i})$ with $0 \leq i \leq n$ is calculated based on corresponding sensor data obtained before time $t_x$ and is an appropriate command to be actuated during the time interval $(t_{x+i}, t_{x+i+1})$. The sequence $S(t_x)$ consequently contains commands for controlling an actuator at a plurality of different time intervals $(t_x, t_{x+1}), (t_{x+1}, t_{x+2}), \ldots, (t_{x+n}, t_{x+n+1})$ with $t_x < t_{x+1} < \ldots < t_{x+n} < t_{x+n+1}$. Accordingly, the command $C(t_x, t_x)$ is the first actuation command in the sequence of actuation commands $S(t_x)$, and is applied at time interval $(t_x, t_{x+1})$. The command $C(t_x, t_{x+1})$ is the second actuation command in the sequence of actuation commands $S(t_x)$ and is applied at time interval $(t_{x+1}, t_{x+2})$, immediately after the actuation command $C(t_x, t_x)$ is applied if a fault prevents the actuation ECU 23 from receiving an updated sequence of actuation commands $S(t_{x+1})$. Similarly, the command $C(t_x, t_{x+2})$ is the third actuation command in the sequence of actuation commands $S(t_x)$, and is applied at time interval $(t_{x+2}, t_{x+3})$, immediately after the actuation command $C(t_x, t_{x+1})$ is applied if a fault prevents the actuation ECU 23 from receiving an updated sequence of actuation commands $S(t_{x+1})$ or $S(t_{x+2})$.

Once the first control ECU 30 and/or the second control ECU 32 have developed the sequence of corresponding actuation commands $S(t_x)$ before time $t_x$, the sequence of actuation commands $S(t_x)$ obtained from the corresponding data sensed before time $t_x$ is transmitted from the first control ECU 30 and/or the second control ECU 32 to the actuation ECU 23 via the first serial data link 34 and/or the second serial data link 36. Upon the actuation ECU 23 receiving the sequence of actuation commands $S(t_x)$ at time $t_x$, the actuation ECU 23 stores the sequence of actuation commands $S(t_x)$ in the memory of the actuation ECU 23.

As noted above, once the actuation ECU 23 receives the sequence of actuation commands $S(t_x)$ at time $t_x$, the actuation ECU 23 applies the first actuation command of the sequence of actuation commands $S(t_x)$ immediately at time $t_x$. In other words, the actuation ECU 23 applies the actuation command $C(t_x, t_x)$ during the time interval $(t_x, t_{x+1})$. The remaining actuation commands $C(t_x, t_{x+1}), \ldots, C_x, t_{x+n})$ included in the sequence of actuation commands $S(t_x)$ are for emergency control of the actuator 22 only, and are estimates calculated before time $t_x$ of how to control the actuator 22 at future time intervals $(t_{x+1}, t_{x+2}), \ldots, (t_{x+n}, t_{x+n+1})$.

Accordingly, the control system 20 continues to develop the updated sequence of actuation commands $S(t_{x+1})$ before time $t_{x+1}$. Developing the updated sequence of actuation commands $S(t_{x+1})$ is done in the same manner as described above for the sequence of actuation commands $S(t_x)$. Specifically, the method further includes sensing data before time $t_{x+1}$. The data sensed before time $t_{x+1}$ is related to the operation of the actuator 22, and may include any required type of data related to any operating parameter required to operate the actuator 22. The sensed data obtained before time $t_{x+1}$ is transmitted through both the first serial data link 34 and the second serial data link 36 to each of the first control ECU 30 and the second control ECU 32 simultaneously or sequentially and independently of each other.

Once the first control ECU 30 and the second control ECU 32 receive the corresponding data sensed before time $t_{x+1}$, the first control ECU 30 and/or the second control ECU 32 process the corresponding data sensed before time $t_{x+1}$ to develop a sequence of actuation commands from the corresponding data obtained before time $t_{x+1}$. The sequence of actuation commands are instructions on how to control the actuator 22 at a plurality of different time intervals. The sequence of actuation commands for the different time intervals may, for example, be represented by: $S(t_{x+1})=C(t_{x+1}, t_{x+1}), C(t_{x+1}, t_{x+2}), \ldots, C(t_{x+1}, t_{x+n+1})$, wherein $S(t_{x+1})$ is the sequence of actuation commands and $t_{x+1}$ is the time at which the sequence is provided to the actuation ECU 23. Each actuation command $C(t_{x+1}, t_{x+i})$ with $1 \leq i < n+1$ is calculated based on the corresponding sensor data obtained before time $t_{x+1}$ and is an appropriate command to be actuated during the time interval $(t_{x+i}, t_{x+i+1})$. The sequence $S(t_{x+1})$ consequently contains commands for controlling an actuator at a plurality of different time intervals $(t_{x+1}, t_{x+2}), (t_{x+2}, t_{x+3}), \ldots, (t_{x+n+1}, t_{x+n+2})$ with $t_{x+1} < t_{x+2} < \ldots < t_{x+n+1} < t_{x+n+2}$. Accordingly, the command $C(t_{x+1}, t_{x+1})$ is the first actuation command in the sequence of actuation commands $S(t_{x+1})$, and is applied at time interval $(t_{x+1}, t_{x+2})$. The command $C(t_{x+1}, t_{x+2})$ is the second actuation command in the sequence of actuation commands $S(t_{x+1})$, and is applied at time interval $(t_{x+2}, t_{x+3})$, immediately after the actuation command $C(t_{x+1}, t_{x+1})$ is applied if a fault prevents the actuation ECU 23 from receiving an updated sequence of actuation commands $S(t_{x+2})$. Similarly, the command $C(t_{x+1}, t_{x+3})$ is the third actuation command in the sequence of actuation commands $S(t_{x+1})$, and is applied at time interval $(t_{x+3}, t_{x+4})$, immediately after the actuation command $C(t_{x+1}, t_{x+2})$ is applied if a fault prevents the actuation ECU 23 from receiving an updated sequence of actuation commands $S(t_{x+2})$ or $S(t_{x+3})$.

Once the first control ECU 30 and/or the second control ECU 32 have developed the sequence of corresponding actuation commands $S(t_{x+1})$ before time $t_{x+1}$, the sequence of actuation commands $S(t_{x+1})$ obtained from the corresponding data sensed before time $t_{x+1}$ is transmitted from the first control ECU 30 and/or the second control ECU 32 to the actuation ECU 23 via the first serial data link 34 and/or the second serial data link 36. Upon the actuation ECU 23 receiving the sequence of actuation commands $S(t_{x+1})$ at time $t_{x+1}$, the actuation ECU 23 stores the sequence of actuation commands $S(t_{x+1})$ in the memory of the actuation ECU 23, and deletes the sequence of actuation commands obtained from data at time $t_x$ from the memory of the actuation ECU 23.

As noted above, once the actuation ECU 23 receives the sequence of actuation commands $S(t_{x+1})$ for time $t_{x+1}$, the actuation ECU 23 applies the first actuation command of the sequence of actuation commands $S(t_{x+1})$ immediately at time $t_{x+1}$. In other words, the actuation ECU 23 applies the actuation command $C(t_{x+1}, t_{x+1})$ during the time interval $(t_{x+1}, t_{x+2})$. The remaining actuation commands $C(t_{x+1}, t_{x+2}), \ldots, C(t_{x+1}, t_{x+n+1})$ included in the sequence of actuation commands $S(t_{x+1})$ are for emergency control of the actuator 22 only, and are estimates calculated before time $t_{x+1}$ for how to control the actuator 22 at future time intervals $(t_{x+2}, t_{x+3}), \ldots, (t_{x+n+1}, t_{x+n+2})$.

However, if a fault develops in the control system 20 and prevents the actuation ECU 23 from receiving the updated sequence of actuation commands $S(t_{x+1})$ at time $t_{x+1}$, the actuation ECU 23 may utilize the actuation commands included in the sequence of actuation commands $S(t_x)$ received at time $t_x$ for the time intervals $(t_x, t_{x+1}), (t_{x+1}, t_{x+2}), \ldots, (t_{x+n}, t_{x+n+1})$ to maintain operation of the actuator 22 for a limited time period. Accordingly, the method further includes identifying a fault that at least temporarily prevents the actuation ECU 23 from receiving the sequence of actuation commands $S(t_{x+1})$ at time $t_{x+1}$. The fault may occur in any of the sensors 24, 26, 28, any of the control ECUs, or any of the serial data links. Furthermore, the fault may include any incident that prevents the actuation ECU 23 from receiving the sequence of actuation commands, including but not limited to equipment failures or a "babbling idiot" fault affecting the serial data links The fault may be identified in any suitable manner. For example, the fault may be identified by the actuation ECU 23 by failing to register receipt of the updated sequence of actuation commands $S(t_{x+1})$ at time $t_{x+1}$.

If a fault is identified and the ECU fails to receive the updated sequence of actuation commands $S(t_{x+1})$ from the corresponding data obtained before time $t_{x+1}$, then the actuation ECU 23 may apply the actuation command for a specific time interval from $(t_{x+1}, t_{x+2}), \ldots, (t_{x+n}, t_{x+n+1})$ from the sequence $S(t_x)$, which is stored in the memory of the actuation ECU 23, thereby providing continued control of the actuator 22 for n−1 time intervals. This process may be continued for each of the n−1 time intervals included in the sequence of actuation commands $S(t_x)$. More specifically, the actuation ECU 23 may apply the actuation command for the time interval $(t_{x+1}, t_{x+2})$ from the sequence $S(t_x)$ after applying the actuation command for the time interval $(t_x, t_{x+1})$ from the sequence $S(t_x)$, and upon identifying a fault that at least temporarily prevents the actuation ECU 23 from receiving the transmitted sequence of actuation commands $S(t_{x+1})$ at time $t_{x+1}$. Similarly, the actuation ECU 23 may apply the actuation command for the time interval $(t_{x+2}, t_{x+3})$ from the sequence $S(t_x)$ after applying the actuation command for the time interval $(t_{x+1}, t_{x+2})$ from the sequence $S(t_x)$, and upon identifying a fault that at least temporarily prevents the actuation ECU 23 from receiving the transmitted sequence of actuation commands $S(t_{x+1})$ at time $t_{x+1}$.

Referring to FIG. 2, an example of the above described method is provided. The example provides steering angle values to an electric power steering actuator 22 of a vehicle. Within FIG. 2, a first column labeled 50 shows a control iteration for subsequent time intervals, a second column labeled 52 shows the sequence of actuation commands stored in the memory of the actuation ECU 23 and available for controlling the actuator 22, a third column labeled 54 shows the value of the actuation command, i.e., the steering angle, applied for each specific control iteration, and a fourth column, labeled 56 indicates whether the updated sequence of actuation commands was received and available to the actuation ECU 23 (indicated by Y), or was not received by the actuation ECU 23 (indicated by N).

Referring to control iteration 1 of FIG. 2, the sequence of actuation commands available to ECU 23 at time $t_x$ is shown as $S(t_x)=C(t_x, t_x), C(t_x, t_{x+1}), C(t_x, t_{x+2}), C(t_x, t_{x+3})$, wherein $C(t_x, t_x)$ is equal to 0.00, $C(t_x, t_{x+1})$ is equal to 8.21, $C(t_x, t_{x+2})$ is equal to 9.45, and $C(t_x, t_{x+3})$ is equal to 1.70. The actuation ECU 23 applies the actuation command for time interval $(t_x, t_{x+1})$, which is equal to 0.00. Referring to control iteration 2 of FIG. 2, the sequence of actuation commands available to ECU 23 at time $t_{x+1}$ is shown as $S(t_{x+1})=C(t_{x+1}, t_{x+1}), C(t_{x+1}, t_{x+2}), C(t_{x+1}, t_{x+3}), C(t_{x+1}, t_{x+4})$, wherein $C(t_{x+1}, t_{x+1})$ is equal to 8.30, $C(t_{x+1}, t_{x+2})$ is equal to 9.33, $C(t_{x+1}, t_{x+3})$ is equal to 2.12, and $C(t_{x+1}, t_{x+4})$ is equal to 0.05. Because no fault was detected and the actuation ECU 23 received the updated sequence of actuation commands $S(t_{x+1})$ at time $t_{x+1}$, the actuation ECU 23 applies the first actuation command in the sequence $S(t_{x+1})$ for time interval $(t_{x+1}, t_{x+2})$, which is equal to 8.30. Referring to control iteration 3 of FIG. 2, a fault was detected and the actuation ECU 23 did not receive the updated sequence of actuation commands $S(t_{x+2})$ at time $t_{x+2}$. Accordingly, the actuation ECU 23 utilizes the actuation commands for the intervals $(t_{x+2}, t_{x+3})$, $(t_{x+3}, t_{x+4})$ and $(t_{x+4}, t_{x+5})$ stored in the memory of the actuation ECU 23 to control the actuator 22. Specifically, the sequence of actuation commands for iteration 3 is shown as $S(t_{x+1})=C(t_{x+1}, t_{x+1})$, $C(t_{x+1}, t_{x+2})$, $C(t_{x+1}, t_{x+3})$, $C(t_{x+1}, t_{x+4})$, wherein $C(t_{x+1}, t_{x+1})$ is equal to 8.30, $C(t_{x+1}, t_{x+2})$ is equal to 9.33, $C(t_{x+1}, t_{x+3})$ is equal to 2.12, and $C(t_{x+1}, t_{x+4})$ is equal to 0.05. Because a fault was detected and the actuation ECU 23 did not receive the updated sequence of actuation commands $S(t_{x+2})$ at time $t_{x+2}$, the actuation ECU 23 applies the next actuation command in the sequence of actuation commands $S(t_{x+1})$, which is the second actuation command in the sequence $S(t_{x+1})$ for time interval $(t_{x+2}, t_{x+3})$, which is equal to 9.33. Similarly, referring to control iteration 4 of FIG. 2, a fault was detected and the actuation ECU 23 did not receive the updated sequence of actuation commands $S(t_{x+2})$ or $S(t_{x+3})$. Accordingly, the actuation ECU 23 utilizes the actuation commands for intervals $(t_{x+3}, t_{x+4})$ and $(t_{x+4}, t_{x+5})$, stored in the memory of the actuation ECU 23 to control the actuator 22. Specifically, the sequence of actuation commands for iteration 4 is shown as $S(t_{x+1})=C(t_{x+1}, t_{x+1})$, $C(t_{x+1}, t_{x+2})$, $C(t_{x+1}, t_{x+3})$, $C(t_{x+1}, t_{x+4})$. $C(t_{x+1}, t_{x+1})$ is equal to 8.30, $C(t_{x+1}, t_{x+2})$ is equal to 9.33, $C(t_{x+1}, t_{x+2})$ is equal to 2.12, and $C(t_{x+1}, t_{x+3})$ is equal to 0.05. Because a fault was detected and the actuation ECU 23 did not receive the updated sequence of actuation commands $S(t_{x+2})$ or $S(t_{x+3})$, the actuation ECU 23 applies the next actuation command in the sequence of actuation commands $S(t_{x+1})$, which is the third actuation command in the sequence $S(t_{x+1})$ for time interval $(t_{x+3}, t_{x+4})$, which is equal to 2.12. The same process is followed for the fifth iteration shown in FIG. 2, and the actuation ECU 23 applies the next actuation command in the sequence of actuation commands $S(t_{x+1})$, which is the fourth actuation command in the sequence $S(t_{x+1})$ for time interval $(t_{x+4}, t_{x+5})$, which is equal to 0.05. Accordingly, it should be appreciated that the actuation ECU 23 may continue controlling the actuator 22 for a limited time in the event a serial data link fault prevents the actuation ECU 23 from receiving updated and current actuation commands.

It should be appreciated that the number of actuation commands n that may be included in each sequence of actuation commands is limited by the specific application, the specific type of data collected by the sensors 24, 26, 28, and changing operating conditions. Furthermore, it should be appreciated that a deviation may exist and increases with an increase in the number of time intervals n.

The invention includes a roll back capability to allow the actuation ECU 23 to apply prior commands $S(t_{x-1})$ if a fault prevents the actuation ECU 23 from receiving an updated sequence of actuation commands $S(t_{x+1})$ if there is a potential that commands $S(t_x)$ have already been corrupted by the fault. This may be the case if the system allows transient faults to persist for some time period before being recorded as a permanent fault. The invention is not restricted to only allowing prior commands $S(t_{x-1})$ to be applied; The specific set of prior commands to select depends on the transient fault criteria of a given application.

While the best modes for carrying out the invention have been described in detail, those familiar with the art to which this invention relates will recognize various alternative designs and embodiments for practicing the invention within the scope of the appended claims.

The invention claimed is:

1. A method of controlling an actuator, the method comprising:
developing a sequence of actuation commands $S(t_x)$, with a control Electronic Control Unit (ECU) from data obtained before a time interval $t_x$ to control the actuator at a plurality of different time intervals $t_x$, $t_{x+1}$, $t_{x+2}$, ..., $t_{x+n}$, with the sequence of actuation commands including at least one actuation command for each of the different time intervals, wherein t represents a time and x represents an interval, such that $t_x$ represents a time interval, and n represents a total number of time intervals;
wherein the sequence of actuation commands for the different time intervals is equal to:

$$S(t_x)=C(t_x),C(t_{x+1}),\ldots,C(t_{x+n});$$

wherein $S(t_x)$ is the sequence of actuation commands obtained from the data before the time interval $t_x$, and C is an actuation command for a time interval;
sending the sequence of actuation commands $S(t_x)$ obtained from the data before the time interval $t_x$ from the control ECU to an actuation ECU;
storing the sequence of actuation commands $S(t_x)$ obtained from the data before the time interval $t_x$ in the actuation ECU;
applying the actuation command $C(t_x)$ for the time interval $t_x$ from the sequence of actuation commands $S(t_x)$ obtained from the data before the time interval $t_x$, upon the actuation ECU receiving the transmitted sequence of actuation commands $S(t_x)$ from the control ECU;
developing an updated sequence of actuation commands $S(t_{x+1})$, with the control ECU from data obtained before the time interval $t_{x+1}$ to control the actuator at a plurality of different time intervals $t_{x+1}, t_{x+2}, \ldots, t_{x+n}$;
wherein the updated sequence of actuation commands from the data obtained before the time interval $t_{x+1}$ for the different time intervals, is equal to:

$$S(t_{x+1})=C(t_{x+1}),C(t_{x+2}),\ldots,C(t_{x+n});$$

sending the updated sequence of actuation commands $S(t_{x+1})$ from the control ECU to an actuation ECU;
applying the actuation command for the time interval $t_{x+1}$, from the updated sequence of actuation commands $S(t_{x+1})$, after applying the actuation command for the time interval $t_x$ from the sequence of actuation commands $S(t_x)$ and prior to applying any of the remaining actuation commands for time intervals $t_{x+1}, t_{x+2}, \ldots, t_{x+n}$ from the sequence of actuation commands $S(t_x)$, when the actuation ECU receives the updated sequence of actuation commands $S(t_{x+1})$ at time interval $t_{x+1}$ from the data obtained before time interval $t_{x+1}$; and
applying the actuation command for a specific time interval $t_{x+1}, t_{x+2}, \ldots, t_{x+n}$, from the sequence of actuation commands $S(t_x)$, after applying the actuation command for the time interval $t_x$, from the sequence of actuation commands $S(t_x)$ stored in the actuation ECU, when the actuation ECU is unable to receive the updated sequence of actuation commands $S(t_{x+1})$ at time interval $t_{x+1}$ from the data obtained before time interval $t_{x+1}$ to provide continued control of the actuator for n time intervals.

2. A method as set forth in claim 1 further comprising sensing data before the time interval $t_x$ that is related to the operation of the actuator.

3. A method as set forth in claim 2 further comprising transmitting the sensed data obtained before the time interval $t_x$ to at least one control ECU through a serial data link.

4. A method as set forth in claim 3 wherein developing the sequence of actuation commands from the data obtained before the time interval $t_x$ is further defined as processing the sensed data with the control ECU to develop the sequence of actuation commands obtained from the corresponding data sensed before the time interval $t_x$.

5. A method as set forth in claim 4 further comprising transmitting the sequence of actuation commands obtained from the corresponding data sensed before the time interval $t_x$ from the control ECU to the actuation ECU.

6. A method as set forth in claim 5 further comprising sensing data before time interval $t_{x+1}$ that is related to the operation of the actuator.

7. A method as set forth in claim 6 further comprising transmitting the sensed data obtained before time interval $t_{x+1}$ to the control ECU through the serial data link.

8. A method as set forth in claim 7 wherein developing the sequence of actuation commands from the data obtained before time interval $t_{x+1}$ is further defined as processing sensed data obtained before time interval $t_{x+1}$ with the control ECU to develop the sequence of actuation commands obtained from the corresponding data sensed before time interval $t_{x+1}$.

9. A method as set forth in claim 8 further comprising identifying a fault that at least temporarily prevents the actuation ECU from receiving the transmitted sequence of actuation commands obtained from the data sensed at time interval $t_{x+1}$.

10. A method as set forth in claim 9 wherein identifying a fault includes identifying a fault in one of a sensor, the control ECU or the serial data link.

11. A method as set forth in claim 1 further comprising storing the sequence of actuation commands $S(t_{x+1})$ obtained from data at time interval $t_{x+1}$ in the actuation ECU.

12. A method as set forth in claim 11 further comprising deleting the sequence of actuation commands $S(t_x)$ obtained from data at the time interval $t_x$ from the memory of the actuation ECU upon the actuation ECU receiving the updated sequence of actuation commands $S(t_{x+1})$ obtained from data at time interval $t_{x+1}$.

13. A system comprising:
a actuator;
a sensor configured for sensing data related to the control of the actuator;
a control Electronic Control Unit (ECU) in communication with the sensor for receiving data therefrom, and including a processor operable to develop a sequence of actuation commands $S(t_x)$ from the data obtained before a time interval $t_x$ to control the actuator at a plurality of different time intervals $t_x, t_{x+1}, t_{x+2}, \ldots t_{x+n}$, with the sequence of actuation commands including at least one actuation command for each of the different time intervals, wherein t represents a time and x represents an interval such that $t_x$ represents a time interval, and n represents a total number of time intervals;
wherein the sequence of actuation commands for the different time intervals is equal to:

$$S(t_x) = C(t_x), C(t_{x+1}), \ldots C(t_{x+n});$$

wherein $S(t_x)$ is the sequence of actuation commands obtained from the data before the time interval $t_x$, C is an actuation command for a specific time interval; and an actuation ECU including a processor operable to control the actuator, and in communication with the control ECU for receiving the sequence of actuation commands therefrom;

wherein the processor of the actuation ECU is operable to:
store the sequence of actuation commands $S(t_x)$ obtained from the data before the time interval $t_x$, and
apply the actuation command for the time interval $t_x$ from the sequence of actuation commands $S(t_x)$ stored in the actuation ECU;
apply an actuation command for time interval $t_{x+1}$, from an updated sequence of actuation commands $S(t_{x+1})$, when the actuation ECU receives the updated sequence of actuation commands $S(t_{x+1})$ from data obtained before time interval $t_{x+1}$ from the control ECU, after applying the actuation command for the time interval $t_x$ from the sequence of actuation commands $S(t_x)$ and prior to applying any of the actuation commands for any other time interval $t_{x+1}, t_{x+2}, \ldots t_{x+n}$ from the sequence of actuation commands $S(t_x)$;
apply the actuation command for a specific time interval $t_{x+1}, t_{x+2}, \ldots t_{x+n}$ from the sequence of actuation commands $S(t_x)$ stored in the actuation ECU, when the actuation ECU is unable to receive the updated sequence of actuation commands $S(t_{x+1})$ at time interval $t_{x+1}$ from data obtained before time interval $t_{x+1}$ to provide continued control of the actuator for n time intervals; and
delete the sequence of actuation commands $S(t_x)$ from data obtained before the time interval $t_x$ upon the actuation ECU receiving the updated sequence of actuation commands $S(t_{x+1})$ from data obtained before the time interval $t_{x+1}$.

* * * * *